United States Patent

McVey

[11] 3,752,541
[45] Aug. 14, 1973

[54] LINEAR BEARINGS

[76] Inventor: Malcolm John McVey, The Foundry, Queens Rd., High Wycombe, England

[22] Filed: Aug. 3, 1971

[21] Appl. No.: 168,544

[52] U.S. Cl. .............................. 308/6 C
[51] Int. Cl. ............................. F16c 29/06
[58] Field of Search ............ 308/6 C, 6 R, 3 A, 308/185, 216

[56] References Cited
UNITED STATES PATENTS

| | | | |
|---|---|---|---|
| 3,361,500 | 1/1968 | Pöhler | 308/216 |
| 3,478,402 | 11/1969 | Schmude et al. | 308/216 |
| 2,929,661 | 3/1960 | Brown | 308/6 C |
| 2,230,442 | 2/1941 | Arms | 308/3 A |
| 2,672,378 | 3/1954 | McVey | 308/6 C |
| 2,672,379 | 3/1954 | McVey | 308/6 C |
| 3,044,835 | 7/1962 | Hurd | 308/6 C |
| 3,113,807 | 12/1963 | Polidor | 308/3 A |
| 2,830,409 | 4/1958 | Northcutt | 308/6 R |
| 3,236,569 | 2/1966 | Moosmann | 308/6 R |
| 3,304,133 | 2/1967 | Strassberg | 308/6 C |

Primary Examiner—Charles J. Myhre
Assistant Examiner—Barry Grossman
Attorney—Berman, Davidson & Berman

[57] ABSTRACT

A rectilinear rolling bearing in which four rods each formed with at least one longitudinal flat are arranged in a group with their longitudinal axes parallel and so spaced and orientated that the flats define a guideway for rollers contained therein. There may be a passageway parallel with the bearing and diverters at each end of the bearing through which the rollers circulate. Successive rollers may be placed with their aces at right-angles to each other and alternate rollers may be replaced by balls of the same diameter.

11 Claims, 5 Drawing Figures

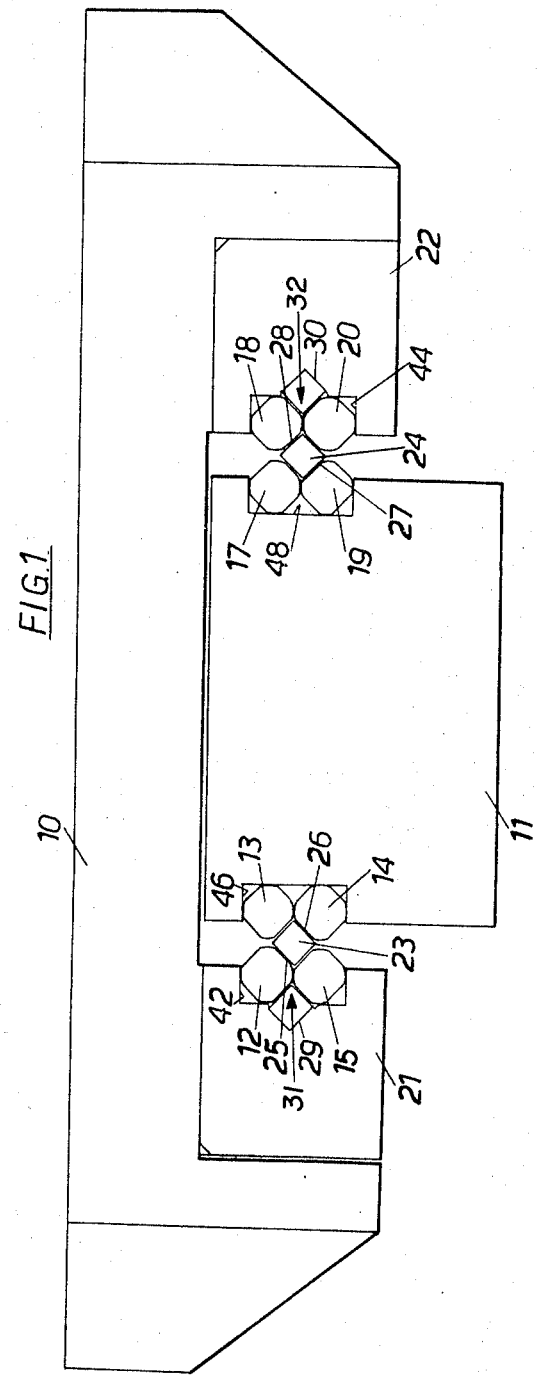

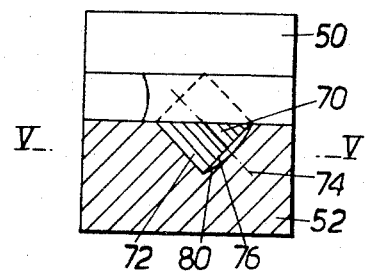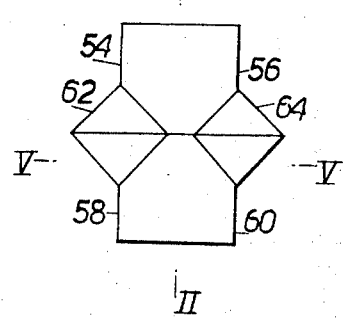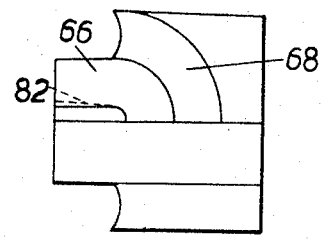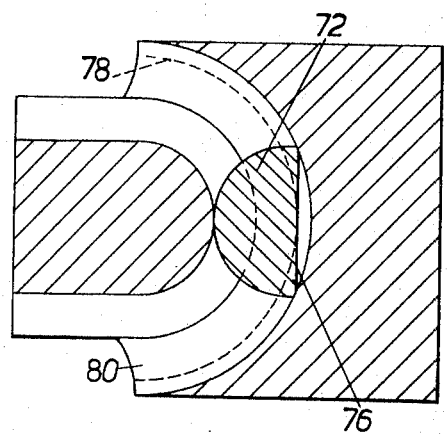

LINEAR BEARINGS

This invention relates to a rectilinear rolling bearing in which a load between two members which are subject to relative movement in a linear direction is transmitted from one to the other through rollers so as to eliminate sliding friction, and in which the rollers may be recirculated through the bearing.

Rectilinear rolling bearings using balls to transmit the load are already known, a typical example which includes the feature of recirculation being disclosed in our British patent No. 666,543. A disadvantage accompanying the use of balls is that their load carrying capacity is low in relation to the load carrying capacity of rollers and for this reason it is also known to use rollers instead of balls. However, rectilinear bearings using rollers have hitherto suffered from certain difficulties in the system for recirculating the rollers and it has been necessary to make the parts to a very high standard of accuracy to ensure that the rollers bear correctly on the surfaces on which they run.

An important object of the invention is to overcome those difficulties and provide a compact bearing which can be manufactured to normal tolerances without loss of load capacity.

The invention consists of a rectilinear rolling bearing for transmitting a bearing load between two relatively movable members comprising four rods each formed with at least one longitudinal flat, the rods being arranged in a group with their longitudinal axes parallel and so spaced and orientated that the flats define a guideway or track for rollers, and rollers in the guideway or track through which a load may be transmitted from any one rod to the opposite rod, a pair of adjacent rods being connected to one member for movement with the said one member and the other pair of rods being connected to the other member for movement with the said other member.

In one form of the invention the rods contained in one of the members are each formed with at least two flats at right-angles to each other, the said one of these members is so shaped as to provide, in conjunction with flats on the rods located therein, a passageway through which rollers may pass, and there is a diverter at each end by which the passageway is connected to the guideway. Each of the rods may be formed with four flats each at right-angles to the adjacent flat. The parts of the peripheries of the rods not occupied by flats may be cylindrical.

As already stated, a bearing of this general construction using balls is disclosed in out aforementioned patent specification and the construction of the bearing according to the present invention using rollers may follow the same general principles. However, in order that the invention may be thoroughly understood an example of an assembly incorporating the bearing according to the present invention will now be described with reference to the accompanying drawings, in which —

FIG. 1 is a section through a movable table, such as a machine table, which is movable with respect to a bed, such as a machine bed, the assembly containing rectilinear rolling bearings according to the invention;

FIG. 2 is a sectional elevation of the diverter with the lower block sectioned on the line II—II of FIG. 3;

FIG. 3 is a front elevation of the diverter;

FIG. 4 is a plan view of the diverter with one half of the upper block cut away to show the face of the lower block; and FIG. 5 is a section on the line V—V of FIG. 2 and FIG. 3, looking downwardly, and drawn to an enlarged scale.

Figure 6:
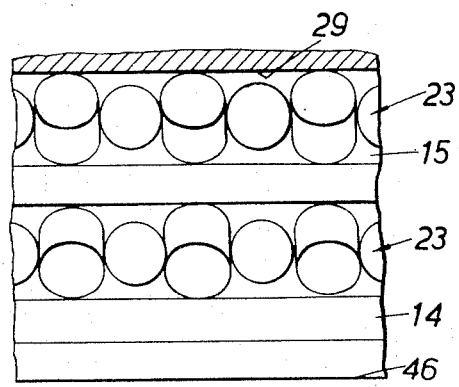
Figure 7:
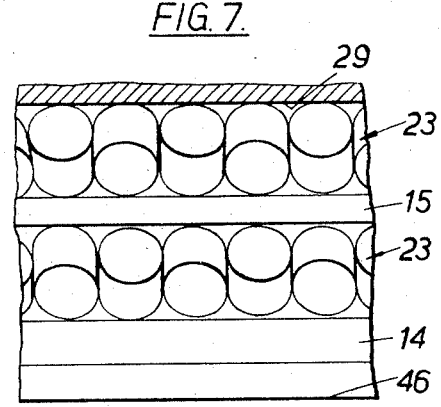

In the drawings the radii formed on the ends of the cylindrical parts are omitted for clarity.

Referring to the drawings, a movable table 10 is supported on a bed 11, which may be a machine bed. The table 10 is formed with two rectangular grooves, respectively 42 and 44, in vertical surfaces which face each other in the absence of the bed 11, and the bed 11 is provided with rectangular grooves 46 and 48 in opposite surfaces, so formed that the grooves 42 and 46 are opposite each other and the grooves 44 and 48 are opposite each other. The two rectilinear bearings are identical. One comprises four rods, respectively 12, 13, 14 and 15, each of which has a cross-section in the form of a circle with four segments removed so as to form four flats which define a part of a square. One pair of adjacent rods, 12 and 15, is located in the recess 42 in the bed 11 and the remaining pair of rods, 13 and 14, is located in the recess 46, the rods being placed so that the flats are 45° to the top of the table 10 and bed 11 and arcuate parts of the cross-sections of the rods bear on the flat faces of the recesses as shown. The second rectilinear bearing comprises four rods 17, 18, 19 and 20 identical with the rods 12 to 15. One pair of adjacent rods, 18 and 20, of the second bearing is located in the recess 44 in the table 10 and the remaining pair 17 and 19, of the rods is located in the recess 48 in the bed 11. The recesses 42 and 44 are actually formed in blocks 21 and 22 carried under the table 10, the block 21 being movable in a direction transverse to the direction of the rods 12 to 15 and 17 to 20, as will be more particularly described later.

The longitudinal axes of all the rods 12 to 15 and 17 to 20 are parallel and the orientation of the rods about their axes is such that one flat of each of the rods in one bearing together define a square passage between the rods which forms a guideway or track for rollers indicated respectively at 23 and 24. The rollers 23 are in rolling contact with the faces 25 and 26 of the opposite rods 12 and 14 respectively, and the rollers 24 are in rolling contact with the faces 27 and 28 of the opposite rods 18 and 19. In each of the bearings there is a small clearance between the flat ends of the rollers and the faces of the respective adjacent rods 13 and 15 or 17 and 20. Thus a downward load on the table 10 is transmitted through the blocks 21 and 22 to the rods 12 and 18 and thence through the rollers to the rods 14 and 19 and to the bed 11. By virtue of the fact that the rollers are inclined, as shown, sideways movement of the table relative to the bed is prevented.

In the arrangement just described the downward load of the table 10 is relied upon to maintain the transverse location of the table with respect to the bed 11, since, if this load is reversed (that is to say if the table 10 is lifted), the clearance which is of necessity provided between the ends of the rollers 23 and 24 and the adjacent faces of the rods 13, 15, 17 and 20 (by making the length of the rollers slightly less than their diameter) will permit the table to rise very slightly or to move transversely to a small extent relative to the bed. Where such a reversal of load is likely to occur either one of two modifications is possible to ensure that the table 10 will maintain the correct alignment with respect to the bed.

In the first of these modifications all the rollers have a length slightly less than their diameter, as before, and successive rollers are placed with their axes at 90° to one another. Thus the roller adjacent that shown at 23 will roll between the flat faces of the rods 13 and 15 and, together with the other rollers which are similarly inclined, will prevent the table from rising in relation to the bed 12.

In this arrangement, with one half the rollers set with their axes inclined in one direction and the other half with their axes inclined in the other direction the bearings can carry equal loads in either direction, but the permissible load in either direction is one half that which could be carried in one direction with the axes of all the rollers inclined in one direction.

In the second modification, which is particularly suitable for use where the reversed or lifting load is always considerably less than the normal down load, all the rollers are inclined in the same direction but alternate rollers are replaced by balls of the same diameter, the rollers again having a length slightly less than their diameter. In this case, when a reversal loading takes place, the reversed load is taken through the balls between the rods 13, and 15, and 17 and 20. As has already been noted, the load carrying capacity of a ball is less than that of a roller of the same diameter, so that the reversed load which the bearing can carry through the balls is less than the normal load which is carried through the rollers. On the other hand, since the balls are of the same diameter as the rollers they are in contact with the rods 14 and 18 and they therefore assist the rollers in carrying the normal load between its rods. In this arrangement the permissible load in one direction is that which can be carried by the rollers plus that which can be carried by the balls, while the permissible load in the other direction is that which can be carried by the balls alone.

It is also possible to provide another modification in which successive rollers are inclined in opposite directions and balls are placed between each two adjacent rollers. In this arrangement the permissible load in either direction is that which can be carried by one half the rollers plus that which can be carried by the balls.

Since the surfaces of the rods 12 to 15 and 17 to 20 which are in contact with the walls of the recesses 42, 44, 46 and 48 are all arcuate in form the rods may rotate slightly to align themselves in such a manner that the flat surfaces 25, 26, 27 and 28 are accurately aligned and so bear evenly on the rollers. The block 21 is movable towards and away from the bed 10 by means of jack screws (not shown) so as to adjust the horizontal width of the guideway in which the rollers and the balls (if these are used) run.

In the embodiment shown all the rods are of identical cross-section and each has four flat surfaces of the same size, adjacent faces being at right-angles. Consequently, if wear takes place on any face of a rod with which the rollers, and balls if used, were initially in contact, the rods may be interchanged or rotated to present new, unworn faces to the rollers and the balls, if used. Further Vee shaped recesses 29 and 30 are provided in the respective blocks 21 and 22, of such shape that, in conjunction with the adjacent flat faces of the rods 12 and 15, and the rods 18 and 20, they provide respective passageways 31 and 32 through which the rollers, and balls if used, in the bearing can pass with a small clearance.

At each end of the bearing a diverter is provided which communicates with the end of the guideway between the rods and with the end of the adjacent recess 29 or 30. The diverter is formed in a block which is shown in FIGS. 2 to 5.

FIGS. 2 to 5 show the diverter by which the rollers 23 and 24 are diverted from the central tracks shown in FIG. 1 to the return ducts formed by recesses 29 and 30. The diverter consists of two shaped metal blocks which are mirror images of each other and are placed together in use.

As shown in FIGS. 2 to 4, the diverter comprises an upper block 50 and a lower block 52. The sides of the upper block are formed with flat faces 54 and 56 while the lower block is formed with corresponding faces 58 and 60, and the intermediate parts of the two blocks between these faces define Vee shaped projections at the two sides, respectively 62 and 64. The combined height of the two blocks is such that they will fit into the rectangular grooves 42 or 44, one or other of the Vee projections 62 or 64 then nesting into the return duct 29 or 30. With the diverter in position in the left-hand bearing in FIG. 1, one Vee projection lies in the return duct 29 and the other Vee projection faces the track containing the rollers 34 or 40. As will be evident from a study of the Figures the Vee projections 62 and 64 at the sides of the block define entrances to openings formed by two Vee grooves, one in the lower block being defined by faces 66 and 68 (FIG. 4) and the other being a corresponding Vee groove in the upper block. The diverter is placed at the ends of the guide rods 14 and 20 so that as each roller passes beyond the guide rods it enters the opening in the diverter and is carried round the substantially square tunnel defined by the Vee grooves in the upper and lower blocks and is then directed into the return duct 36. If only balls were used the grooves defined by the surfaces 66 and 68 in the lower block and the corresponding surfaces in the upper block could be true Vee grooves having straight sides but this is not possible where rollers are used as may be seen from a consideration of FIG. 5, which is a section on the line V—V in FIG. 2 and FIG. 3. A roller 70 is shown in position in FIG. 2 and the lower part 72 of this roller is seen in FIG. 5. The roller is so placed in the groove that its axis 74 slopes forwardly hence the end 76 of the roller is a flat surface. If the Vee groove had straight sides then there would be interference between the diameter of the roller and the wall of the groove. If the groove had a straight side corresponding to the flat end 76 of the roller then the edge of the groove in the section would be as represented by the dotted line 78. As is evident from FIG. 5 however the flat end 76 of the roller makes it necessary that the side of the groove should be hollow as shown at 80 in FIG. 2. This shaping is only necessary on the outer wall of the groove and the inner wall 66 may be straight. If all the rollers are placed as shown in FIG. 2, then only the outer wall of the lower block need be grooved as at 80. If, however, it is desired to place some of the rollers with their axes as shown at 74 but with alternate rollers having their axes at right angles to the roller 70 then it is necessary that the outer groove of the upper block should also have a curved contour. Where balls are used in conjunction with rollers the balls will pass easily through the diverter irrespective of whether particular grooves have the curved contour or not. There is, of course, no load on the balls or rollers while they are passing through the diverter or the passageway.

In order to facilitate the passage of the rollers (and balls if used) into and out of the guideway and the passageway the ends of the Vee grooves defining the semi-circular tunnel in the diverter may be turned outwardly to a small extent as indicated by the dotted line 82 in FIG. 4.

In the example of the invention hereinbefore described the four rods are each formed with four flats each flat being placed at right-angles to the adjacent flat. In order to provide the rectilinear bearing each of the rods need only to have one flat. For the return passageway two of the rods must be formed with two flats each. Each of the rods may, if desired, be formed with more than the minimum number of flats and these extra flats may be used to provide new wearing surfaces when the flats originally used for the bearing become worn, by the simple process of placing the rods in different positions. The parts of the peripheries of the rods not occupied by the large flats necessary to form the bearing races may be of cylindrical form, or may consist of smaller flats, as desired.

I claim:

1. A rectilinear rolling bearing for transmitting a bearing load between two relatively movable members comprising four rods each formed with at least one longitudinal flat, the rods being arranged in a group with their longitudinal axes parallel and so spaced and orientated with respect to each other that the flats define a guideway or track for rollers, rollers in the guideway or track through which a load may be transmitted from any one rod to the diagonally opposite rod, one pair of adjacent rods being connectable to one member for movement therewith and the other pair of rods being connectable to he other member for movement therewith, a passageway parallel with the guideway or track through which the rollers may move from one end of the guideway to the other, the rods being so orientated that the axes of the rollers lie at an angle of 45° to a plane containing the longitudinal center lines of the guideway and the passageway, and a diverter at each end of the guideway to connect the guideway to the passageway, each diverter being formed to provide a semi-circular tunnel the ends of which are aligned with the adjacent ends of the guideway and passageway, the cross-section of the tunnel being approximately square, the two sides of the square lying nearest the center of the semi-circle being straight, and at least one of the other sides being concave to allow the rollers to pass through without interference while being accurately guided.

2. A bearing as claimed in claim 1 in which the two rods which are connectable to one of the movable members are each formed with at least two flats at right angles to each other, one flat of each of the said two rods forming one wall of the guideway, another flat of each of the said two rods forming one wall of the passageway.

3. A bearing as claimed in claim 1 in which each rod is formed with four longitudinal flats each at right angles to the adjacent flat.

4. A bearing as claimed in claim 1 in which the parts of the peripheries of the rods not occupied by the flats are cylindrical.

5. A bearing as claimed in claim 1 in which alternate rollers are replaced by balls of the same diameter.

6. A mechanism such as a machine tool having two relatively movable members and including a rectilinear rolling bearing for transmitting a bearing load between the said members, the said bearing comprising four rods each formed with at least one longitudinal flat, the rods being arranged in a group with their longitudinal axes parallel and so spaced and orientated with respect to each other that the flats define a guideway or track for rollers, a groove of rectangular cross-section in each of the said members parallel to the desired line of relative movement between the said members, one pair of adjacent rods being fixed in each of the said grooves for movement with the respective member, rollers in the guideway through which a bearing load may be transmitted from one of the said members to the other, a passageway parallel with the guideway through which the rollers may move from one end of the guideway to the other, the rods being so orientated in the respective grooves that the axes of the rollers lie at an angle of 45° to a plane containing the longitudinal center lines of the guideway and the passageway, and a diverter at each end of the guideway to connect the guideway to the passageway, each diverter being formed to provide a semi-circular tunnel the ends of which are aligned with the adjacent ends of the guideway and passageway, the cross-section of the tunnel being approximately square, the two sides of the square lying nearest the center of the semi-circle being straight, and at least one of the other sides being concave to allow the rollers to pass through without interference while being accurately guided.

7. A mechanism as claimed in claim 6 in which the diverter comprises two blocks placed together, the adjacent faces of the blocks being formed with Vee grooves substantially defining a semi-circle so that when placed together they form a semi-circular tunnel through which the rollers leaving the guideway may travel to the passageway.

8. A mechanism as claimed in claim 7 in which the blocks constituting the diverter have outwardly projecting portions at their sides together forming Vee shaped projections, the ends of the semi-circular tunnel opening at the Vee shaped projections.

9. A mechanism as claimed in claim 8 in which the diverter rests in the rectangular groove in one member, the Vee shaped projection lying in the passageway, the ends of the semi-circular tunnel respectively facing the guideway and the passageway.

10. A mechanism as claimed in claim 7 in which the rollers are placed in the bearing with their axes parallel and the outer surface of the Vee groove in one block is made concave.

11. A mechanism as claimed in claim 7 in which alternate rollers are placed with their axes at right angles to the other rollers and the outer surfaces of the Vee grooves in both blocks are made concave.

* * * * *